United States Patent Office 3,652,730
Patented Mar. 28, 1972

3,652,730
PROCESS FOR GRAFTING POLYMERISABLE MONOMERS ONTO CRYSTALLINE UNPRE-ACTIVATED POLYOLEFINES
Claude Favie, Billere, and Werner Dellsperger and Philippe Meline, Pau, France, assignors to Société Anonyme dite: Société Nationales des Petroles d'Aquitaine, Courbevoie, France
No Drawing. Filed June 24, 1969, Ser. No. 836,146
Claims priority, application France, June 28, 1968, 157,144
Int. Cl. C08f 15/00
U.S. Cl. 260—878 R                    19 Claims

ABSTRACT OF THE DISCLOSURE

A process for grafting polymerisable monomers onto crystalline unpreactivated polyolefines in an aqueous suspension and with the aid of chemical producers of free radicals comprises forming a suspension of the crystalline polyolefine containing the monomer to be grafted, bringing this polyolefine to a temperature which is at least equal to the fusion temperature, adding the producer of free radicals to the suspension and maintaining the reaction temperature at at least the said fusion temperature during the grafting reaction.

---

This invention relates to the grafting of polymerisable monomers onto unpreactivated crystalline polyolefines, in suspension in a generally aqueous liquid phase, at a temperature higher than the melting point of the crystalline polyolefine under consideration.

It is known that saturated hydrocarbon polymers are, by their chemical nature, inert, and because of this, their applications are limited. Work has been carried out to bring to the hydrocarbon chain of these polymers chemical functions which are capable of enlarging their fields of application, for example, with a view to improving their mechanical resistance, their suitability for dyeing, their adherence to various materials, their compatability with other polymers, etc.

To achieve these improvements, the grafting of polymerisable monomers onto the parent polymer is currently used, and the grafting techniques employed are numerous.

These have, however, run into a number of difficulties. An attempt to graft onto a crystalline polyolefine, in an aqueous suspension, a polymerisable monomer which is insoluble in the aqueous dispersion phase has been found to result in the presence of the crystalline phase constituting a barrier which checks or impedes the penetration of the monomer which is to be grafted into the polyolefine particles. Moreover, the polymeric chains or the fragments of chains introduced into the crystallites have been found to be capable of receiving grafts only if the crystalline arrangement is simultaneously disturbed.

If the monomer that is to be grafted penetrates with difficulty into the polymer, the particles of grafted polymer which are obtained at the end of the reaction are heterogeneous. An envelope at the surface of the particles prevents a considerable quantity of grafts and the centres of the particle receive few, if any grafts. Moreover, in consequence of the slow diffusion of the monomer into the polymer particles, a greater quantity of monomer remains dissolved or dispersed in the aqueous phase, and this quantity of monomer will give a homopolymer supplement, which is undesirable since it pollutes the grafted polymer.

The present invention makes it possible to ensure a better diffusion of the molecules of the polymerisable monomers to be grafted into the polymer particles and it permits at least some of the aforementioned disadvantages to be reduced at the same time.

The process in accordance with the invention for grafting polymerisable monomers onto unpreactivated crystalline polyolefines, in aqueous suspension, with the aid of chemical producers or sources of free radicals, is characterised in that, prior to the addition of the source of free radicals into the suspension of the polyolefine containing the monomer to be grafted, the suspension is brought, either alone or in the presence of the monomer, to a temperature which is equal to or higher than the melting point of the crystalline polyolefine and this temperature is maintained throughout the grafting reaction.

The polymer, which is thus present in the dispersion in the molten state, is present in a homogeneous and amorphous form which is especially favourable to the grafting reaction. In this way, a more rapid and deeper penetration of the polymerisable monomer to be grafted into the polymer grains is obtained, which favours the grafting reaction to the detriment of the formation of homopolymers in the liquid phase. The grafted polymer obtained in these conditions is more homogeneous and its purity is greater than would otherwise be the case.

In certain cases, more especially if the temperature is sufficiently high, the polyolefine particles reach a state of plasticity which is sufficient for a moderate mixing of the suspension to provoke a deformation of the particles, and, within each of them, a flow which further favours the homogeneity of the final grafted product.

The increased permeability of the polymer with regard to the monomer is especially favourable when the polymerisable monomer to be grafted is not very compatible with the polyolefine, for example, in the case where the monomer has a polar character which makes it highly soluble in the dispersion phase and not very miscible with the polyolefine.

The process of the invention can be carried out by heating the aqueous suspension of the crystalline polyolefine to a temperature equal to, or higher than, the fusion temperature of the crystalline polyolefine, injecting the monomer or the mixture of polymerisable monomers into the suspension, adding the producer of free radicals and maintaining the reaction mixture at the previous temperature for a time sufficient for the desired rate of grafting to be obtained.

Depending on whether the rate of thermal homopolymerisation of the polymerisable monomer to be grafted is low or high, the monomer can be added to the suspension of the polyolefine either before reaching the desired temperature which is above or equal to the fusion temperature of the crystalline polyolefine, or when this temperature is reached.

The grafting reaction can be carried out in several stages. For example, a monomer can first be grafted, using a peroxide, onto the fused polyolefine and, when the decomposition of the peroxide has finished, a second monomer then is added to the reaction medium, and grafted onto the fused polyolefin by a fresh injection of peroxide.

The presence of oxygen is generally undesirable, so it is preferred to carry out, prior to the grafting reaction, a scavenging of the reaction medium by means of an inert gas.

The temperature to which the aqueous suspension of the unpreactivated crystalline polyolefine is brought must be higher than or equal to the fusion temperature of the said crystalline polyolefine. The fusion temperature of this crystalline polyolefine can be determined by the method described in the ASTM Standard–D.2117–62T (1964 Book of ASTM Standards, Part 27, pp. 672–678).

It is not, however, desirable to raise the temperature of the aqueous suspension of the polyolefine very much above the fusion point of the said polyolefine because if the polymer particles become too fluid, there is a risk of their coalescing. Preferaly temperatures are used which are 2° to 30° C. above the fusion point of the crystalline polyolefine involved.

The duration of the grafting reaction is determined substantially by the speed of decomposition of the catalyst. It can vary from 10 minutes to several hours, and preferably from 15 minutes to six hours.

The process of the invention applies to unpreactivated crystalline polyolefines. By crystalline polyolefines, there is meant the polyolefines which have a crystalline phase when examined by X-ray diffraction. These polyolefines generally comprise two phases, one amorphous and the other crystalline, and they include the homopolymers of ethylene or alpha-olefines having from 3 to 8 carbon atoms, as well as the copolymers of these olefines which have a composition, structure, tacticity and physical properties which give them a crystalline character.

The polyolefines thus defined can be obtained by various techniques, such as the high pressure techniques, catalysis of coordination, and radical polymerisation in solution. By way of examples, mention can be made of high pressure polyethylene, low pressure polyethylene obtained by "Ziegler" catalysis, low pressure isotactic polypropylene obtained by Natta-Ziegler catalysis, isotactic polybutene-1, stereo-regular poly 4-methyl-pentene 1, and the like.

The liquid phase must not render the polyolefine soluble, but it can if necessary dissolve the polymerisable monomers which are to be grafted and also the producer of free radicals. In view of the insolubility of the polyolefines in water, an aqueous phase is generally used to put the polyolefine in suspension.

The aqueous phase can contain a second solvent which is miscible with water; this can, depending on requirements, help the swelling of the polymer, the solubility of the monomer in the aqueous phase, or even the solubility of the producer of free radicals. The use of a composite aqueous phase is extremely interesting in the case where the solvent which is added to the water favours the forming of an emulsion, in the liquid phase, of the homopolymer corresponding to the polymerisable monomer, for it is then possible to obtain from the reaction medium a grafted polymer, which is generally free from any pollution by the homopolymer, by simple filtration and washing.

Beside the modifications which are produced in the solubilities of the compounds involved in the reaction, to the exclusion of the polyolefine, the second solvent can further have a physico-chemical activity capable of modifying the kinetics of the grafting reaction.

Amongst the solvents which can be added to the aqueous phase there may be mentioned, by way of example, aliphatic alcohols, such as ethanol, butanol, etc., and amides, such as dimethylformamide, etc.

The quantity of the liquid phase which is used can vary from 1 to 100 parts per part of the polyolefine in suspension, but it is preferably comprised between 2 and 20 parts.

The putting into suspension of the polyolefine in the aqueous phase can be helped by the use of tensio or surface active agents which can be, without discrimination, anionic, cationic, or non-ionic. It is possible to use, for example, alcoylphenoxypolyoxyethylene ethanols and alkaline alkylsulphates, such as sodium laurylsulphate, etc. If the tensio or surface active agents used are not alone sufficient to maintain the molten polyolefines in suspension recourse may be had to suspension agents of the tricalcium phosphate type, or to thickeners, such as, for example, cellulose compounds of the methoxycellulose type, the said thickening or suspension agents being used in combination with tensio or surface active agents.

The polymerisable monomers which can be used in the process of the invention are unsaturated organic compounds which possess a double bond and which are capable of being activated by a radical method.

These monomers can belong to various chemical families; generally they have no more than 30 carbon atoms. They include, for example, carboxylic or sulphonic acids, esters, amides, aromatic compounds, halogenides, amines, nitriles, ethers or thioethers, ketones and the like.

In the series of unsaturated carboxylic acids, there are included, for example, monocarboxylic acids of the acrylic type, such as acrylic acid, methacrylic acid, alpha-chloroacrylic acid, 1,2-dichloroacrylic acid, cinnamic acid, and the like, unsaturated non-acrylic acids, such as $\omega$-undecilenic acid, oleic acid, and the like, unsaturated dicarboxylic acids and their anhydrides, such as maleic acid and its anhydride, itaconic acid, citraconic acid, glutaconic acid and the like.

Amongst the unsaturated esters there can be given as examples the esters derived from the preceding acids, including more especially the alkyl acrylates and methacrylates, such as ethyl acrylate or methacrylate, acrylates or methacrylates of polyalkylene glycols, such as the monomethacrylate of propylene glycol, the methacrylate of dimethylaminoethyl, and the like.

Another group of esters comprises the unsaturated esters in which the double bond is carried by the esterifying group, such as, for example, vinyl acetate, vinyl benzoate, and the like.

In the series of unsaturated amides there are, for example, amides derived from unsaturated monocarboxylic acids, such as acrylamides, methacrylamides, for example, N,N-dimethylmethacrylamide, and the unsaturated amides in which the double bond is carried by a nitrogen-based group, such as N-vinyl, N-phenyl acetamide, and the like.

Amongst the aromatic compounds examples are the compounds possessing a vinyl group which is bonded to a carbocyclic or heterocyclic mono- or polynuclear group, whether substituted or not. They include more especially, styrene, p-chlorostyrene, p-dimethylaminostyrene, the vinylpyridines, 2-vinylthiophene, 2-vinylcarbazole, and the like.

As examples of monomers belonging to other chemical families, mention may also be made of the unsaturated amines, such as N-alkyl and N-aryl vinylamines, for example N-methyl and N-phenyl vinylamines, the N,N-dialkylvinylamines, for example N,N-diethylvinylamine, the alkylvinylic or arylvinylic ethers or thioethers, such as phenylvinylic ether, benzylvinylic ether and ethylvinylic thioether; the halides of vinyl or of vinylidene, such as vinyl chloride or vinyl fluoride, vinylidene chloride; vinylic nitriles, such as acrylonitriles, the vinylsulphonic acids, certain unsaturated organic derivatives of silicon, such as the vinylsilanes and more especially the vinyltrialcoylsilanes or the vinyltrialcoxysilanes, in which the alcoyls or alcoxy residues contain from 1 to 8 carbon atoms and the like.

These polymerisable monomers can, without discrimination, be soluble, not very soluble, or even insoluble in the liquid phase of the polyolefine dispersion. They can be used alone or mixed together.

The quantity of monomer to be brought into use for the grafting is dependent upon different factors, such as the quantity of monomer to be introduced onto the polyolefine, the nature of the polyolefine, and the like. It is generally comprised between 0.5% and 200% by weight of the polyolefine to be treated.

The grafting catalysts belong to the family of chemical producers or generators of free radicals. They are generally hydroperoxides, peroxides, peracids, peresters, alkyl peroxides, acyl peroxides, ketone peroxides, azoic compounds, or the like.

Preferably, when carrying out the invention, chemical producers of free radicals are used which have a reasonable speed of decomposition between 100° and 240° C., to allow the grafting reaction to be carried out at a relatively high temperature.

Examples of chemical producers of free radicals to which preference is given are benzoyl peroxide tertiary butyl perbenzoate, dicumyl peroxide, ditertibutyl diperphthalate, lauroyl peroxide, bisazoisobutyronitrile, and the like. These compounds can be soluble, insoluble or not very soluble in the reaction medium, and, if they are insoluble, they will if necessary be introduced into the reaction medium in the form of a solution in a volatile solvent, in order to help their dispersion in the said medium.

In order to regularize the length of the grafts, to control the fluidity in the molten state of the reaction products, and to help the control of the kinetics of the reaction, it is possible also to add to the reaction medium transfer agents, such as alcohols or mercaptans, for example, tertiododecylmercaptan, aliphatic hydrocarbides, or other transfer agents.

The process of the invention can be illustrated by the following examples:

EXAMPLE I

Into a 1 litre autoclave made of stainless steel, there are introduced:

400 parts of water
50 parts of dimethylformamide ("DMF" for short)
0.8 part of polyvinylic alcohol
10 parts of tricalcium phosphate
7 parts of calcium chloride
0.2 part of sodium laurylsulphate
100 parts of granulated high pressure polyethylene The diameter of the granules varies between 3.5 and 4 millimetres.

The density of the polyethylene is 0.924 and its index of fluidity is 3.4. The point of crystalline fusion is 114.5° C.

After scavenging with argon, the reactor is closed, and the temperature raised from ambient to 125° C. Having arrived at this temperature, 23.2 parts of ethyl acrylate is progressively injected. After agitation for 15 minutes, there are injected 0.29 part of a 95% solution of tertiary butyl perbenzoate dissolved in 5 cc. of dimethylformamide (concentration $3.4 \times 10^{-3}$ mol/litre).

In these conditions, the ethyl acrylate and the tertiary butyl perbenzoate are soluble in the composite aqueous phase. The reaction is continued for one hour. Then, maintaining the agitation, the temperature is caused to decrease rather slowly to about 100° C. after which the reactor is cooled without special precautions down to the ambient temperature. It is noted that the granules have not then coalesced.

The granules are separated from the reaction medium by filtration. The granules are poured into an N/10 aqueous solution of hydrochloric acid, this being to eliminate the traces of suspension agents.

After washing with water, followed by two washes with boiling acetone, the product is dried out until it is of constant weight. The increase in weight ($\Delta P$) is 15.9 grams.

The rate of grafting, defined as a percentage by weight according to the ratio $$\frac{\Delta P \times 100}{PE + \Delta P} \text{ is } 13.8$$

(PE is the initial weight of the polyethylene).

In these conditions, the ethyl acrylate and the tertiary butyl perbenzoate of tertiobutyl are soluble in the composite aqueous phase.

Several granules 4 mm. in diameter are decorticated so as to isolate approximately one "centre" 1 mm. in diameter. There is seen on this centre a graft of 5%. Similar experiments carried out at 93° C. do not lead to this result.

Making the graft evident is achieved in the following manner:

Two fractions of the product are dissolved hot in the xylene (no insoluble fraction is seen) and are precipitated by boiling, one by methyl ethyl ketone, and the second by methanol.

The above solution-precipitation operation is repeated three times. An elementary analysis, checked infra-red tests, gives a graft of 13.5%. The index of fluidity of the product is 0.220. Products treated in this way are in the form of powder.

Hydrolysis of the ester functions is then carried out by treating the powders with 2 N ethanolic soda at 80° C. for one hour, followed by a washing in boiling water (the sodium polyacrylate homopolymer is soluble in water). After treatment with normal HCl at its boiling point, the acid graft (13%) is obtained (polyacrylic acid is very soluble in water).

In order to carry out a supplementary check on the methods of purification, a polymerisation test of the ethyl acrylate in the absence of polyethylene and of a suspension agent is carried out under the same conditions as the grafting reaction; this gives a solid phase (1.2 g.) and a lacteal aqueous phase. This latter, by the addition (in the cold) of an equivalent quantity of acetone, becomes homogeneous and clear. One part of the solid product treated by normal ethanolic soda (ethanol 50%–water 50%) at 60° C., for 15 minutes, becomes completely soluble. Another part of the solid product treated with acetone becomes soluble at 40° C. in this latter.

The grafted product, after a first treatment with ethanolic soda, is transformed a second time into powder, in order to undergo a new treatment by 2 N ethanolic soda at 80° C. Analysis of the sodium indicates a grafting of 12.5% by weight.

The index of fluidity of the product is 1.5 (index of fluidity of the ester graft=0.22).

When there is carried out, beyond the fusion of the polyethylene, a grafting of ethyl acrylate onto polyethylene in granules 3 to 4 mm. in diameter, there is found, after the introduction of the sodium cation, an increase in the index of fluidity. This increase is all the higher as the proportion by weight of the ester graft is increased above 5%.

For grafting rates of less than 4%, the index of fluidity varies very little.

Under tension, the load at the flow threshold passes from 120 kg./cm.$^2$ for the initial polyethylene to 170 kg. for the salified graft, or an increase of 45%.

The corresponding acid graft obtained by hydrolysis of the saltified material adheres very strongly to aluminium. If the film is stripped, a regular layer of the graft remains stuck to the metal.

EXAMPLE 2

Into a 1 litre autoclave there are introduced:

700 parts of water,
70 parts of polyethylene in the form of a powder, having a density of 0.927 an index of fluidity of 20, and a fusion point of 114° C.,
4 parts of "Methocel HG 90" (which is a hydroxy-propyl-methyl-cellulose),
2.4 parts of "Sarkosyl NL 97" (sodium lauryl sarcosinate which is tensio-active and anionic),
2.4 parts of sodium laurylsulphate.

The temperature is brought to 120° C., and 35 parts of acrylic acid, followed by 0.350 part of benzoyl peroxide are injected.

In spite of the acidity of the medium, the polyethylene does not agglomerate.

Although the acid is soluble in all proportions in the reaction phase, and although the coefficient of separation of the acid is unfavourable to the migration of the latter into the polyethylene, a rate of grafting of 8.30% is obtained at the end of 2 hours. The index of fluidity of the graft is 4.36.

After dissolving the graft in xylene and its precipitation by methanol, the rate of grafting remains constant, thus proving the absence of any retention of the polyacrylic acid homopolymer.

The homopolymer formed during the grafting reaction is rendered completely soluble in the reaction phase from its formation, and it is therefore separated by itself by simple filtration.

EXAMPLE 3

Into a 5 litre autoclave there are poured:

2,660 parts of water
340 parts of dimethylformamide

The added surface-active and suspension agents are those of Example 1, but the quantities used are multiplied by the factor 4. 660 parts of polyethylene are added in granules of 3 to 4 mm. diameter of the same nature as the polyethylene of Example 1. The temperature is raised to 125° C. and there are injected 110 parts of butyl acrylate (which is weakly soluble under these conditions) and 0.280 part of tertiarydodecylmercaptan, which is used as a transfer agent. After thirty minutes agitation, 1.2 parts of tertiary butyl perbenzoate are added; the reaction lasts 80 minutes. The percentage of graft obtained is 9.8; the index of fluidity is 1.5.

EXAMPLE 4

Into a 2 litre autoclave, there are introduced:

1,200 parts of water
150 parts of dimethylformamide

The added surface-active and suspension agents are those of Example 1 but the quantities used are multiplied by the factor 2. 100 parts of a high pressure polyethylene, the characteristics of which are those of the polyethylene of Example 1 are added.

The temperature is brought to 120° C., and 20.9 parts of ethyl acrylate are introduced. After fifteen minutes at this temperature, 0.343 part of tertiarybutyl perbenzoate are introduced. The percentage of graft obtained after 80 minutes is 13.7. The index of fluidity is 0.222.

The product treated with 2 N ethanolic soda at 80° gives the salified product with an index of fluidity of 0.027. Under tension, the load at the flow threshold passes from the value 120 kg./cm.$^2$ for the polyethylene to 165 kg./cm.$^2$ for the salified graft, or an increase of 37%.

EXAMPLE 5

The working conditions are identical to those of Example 4, but there are added into the medium, before the introduction of the monomer, 0.08 part of tertiarydodecylmercaptan. 11% of graft is obtained. The index of fluidity is 1.075.

EXAMPLE 6

The working conditions are identical to those of Example 4 except that the tertiarybutyl perbenzoate is replaced by 0.487 part of 89.3% benzoyl peroxide.

The graft obtained is 17.05%. The index of fluidity is 0.10.

EXAMPLE 7

The quantities of water, of dimethylformamide and of suspension agents are identical to those of Example 1.

100 parts of low pressure polyethylene with an index of fluidity of 5, a fusion point of 132° C. and a density of 0.96 are added. The temperature is taken to 137° C., and then 23.2 parts of ethyl acrylate are injected.

30 minutes later, 0.298 part of tertiarybutyl perbenzoate are injected. The percentage by weight of the graft obtained is 11.5. The purification of the product is carried out as in Example 1.

EXAMPLE 8

Into a 1 litre autoclave of stainless steel, there are introduced:

420 parts of water
30 parts of dimethylformamide
100 parts of granulated polyethylene.

The nature and the quantities of the surface-active and suspension agents, and the nature of the polyethylene, are those of Example 1.

When the temperature reaches 125° C., there is injected, with the aid of a pump, a mixture composed of 7.78 g. of butyl acrylate and 8.63 g. of butyl methacrylate ($13.5 \times 10^{-2}$ mol/l. of each of these two is used. The injection rate is 1 cm.$^3$ every three seconds. In order not to disturb the polyethylene suspension, a rapid introduction of the reactants must be avoided. After 15 minutes, 0.298 part of tertiarybutyl perbenzoate are injected. The duration of the reaction at 125° C. is 70 minutes.

After returning to ambient temperature, the solid phase which is separated by filtration is washed twice, whilst hot, with methyl ethyl ketone. The product is dried to a constant weight.

The increase in weight is 13 g. No gelling by solution of the product in the xylene is observed. Two purifications are carried out by means of the solvent/precipitant mixture of xylene and methyl-ethyl-ketone. The infra-red spectra of the products, both when raw and purified, are identical. The intensity of the carbonyl band at 1730 cm.$^{-1}$ is substantially equal for films of the same thickness.

The percentage by weight of the graft is 11.5. Attack by an alcoholic solution of soda carried out in accordance with the technique of Example 1 leads to a partial salification of the acrylic ester groups.

EXAMPLE 9

The quantities of water, of DMF, the nature and the quantities of surface-active and suspension agents and the nature, form and quantity of the polyethylene are those of Example 8.

When the temperature reaches 125° C., 6.1 parts of ethylacrylate are injected. After 15 minutes at 125° C., 0.298 part of tertiarybutyl perbenzoate are added. The reaction is continued for 45 minutes at 125° C. Then, for a second time, 6.4 parts of 4-vinyl-pyridine are injected.

The reaction is then continued for 45 minutes at 125° C.

After filtration, decomposition of the suspension agents by HCl, washing with water and washing by reflux with acetone, the product is purified by the solvent/precipitant mixture comprising xylene, isopropanol and methyl-ethyl-ketone (86: 14% by weight).

The ratio of the weight of the grafted monomers is 4.75%. The infra-red spectrum of the product indicates the presence of the ester (1730 cm.$^{-1}$) and of pyridinic (1590 cm.$^{-1}$) functions.

We claim:

1. A process for grafting an ethylenically unsaturated monomer onto an unpreactivated crystalline polyolefin in an aqueous suspension and using a chemical producer of free radicals, which process comprises first forming a suspension of said crystalline polyolefin containing said monomer to be grafted, bringing the suspension to a temperature which is at least equal to its fusion temperature, adding said producer of free radicals to said suspension and maintaining the temperature of the resulting reaction at at least said fusion temperature during the grafting reaction wherein the proportion of said monomer to said polyolefin is in the range of 0.5% to 200% by weight and wherein said process is carried out under an inert atmosphere.

2. A process as claimed in claim 1, wherein the temperature of said grafting reaction is maintained in a range of 2° to 30° above the fusion temperature of said crystalline polyolefine.

3. A process as claimed in claim 1, wherein said monomer to be grafted is an unsaturated carboxlyic acid.

4. A process as claimed in claim 1, wherein said monomer to be grafted to selected from the group consisting of acrylic acid, methacrylic acid and maleic acid.

5. A process as claimed in claim 1, wherein said monomer to be grafted is an unsaturated acrylic ester.

6. A process as claimed in claim 1, wherein said monomer to be grafted is selected from the group consisting of alkyl acrylates and alkyl methacrylates.

7. A process as claimed in claim 1, wherein said monomer to be grafted is an arylvinylic compound.

8. A process as claimed in claim 1, wherein said monomer to be grafted is styrene.

9. A process as claimed in claim 1, wherein said crystalline polyolefine is polyethylene.

10. A process as claimed in claim 1, wherein said producer of free radicals is selected from the group consisting of peroxides and peresters.

11. A process as claimed in claim 1, wherein the aqueous suspension of said polyolefine contains, in a proportion of from 1% to 50% by volume, a polar solvent which is miscible with water.

12. A process as claimed in claim 11, wherein said polar solvent is selected from the group consisting of aliphatic alcohols and aliphatic amides.

13. A process as claimed in claim 12, wherein said polar solvent is selected from ethanol and dimethyl formamide.

14. A process as claimed in claim 1, wherein said reaction is effected in a medium which contains at least one chain transfer agent.

15. A process as claimed in claim 14, wherein said chain transfer agent is a mercaptan.

16. A process as claimed in claim 1, wherein said reaction is carried out in a number of stages which comprise dispersing said unpreactivated crystalline polyolefine in an aqueous phase, heating this dispersion to a temperature which is at least equal to the fusion point of said polyolefine, adding to the resulting hot suspension said monomer which is to be grafted, and, subsequent to these operations, injecting said producer of free radicals and keeping the resulting reaction produced at at least said temperature for a time sufficient for the desired grafting to be effected.

17. A process as claimed in claim 16, wherein the addition of said monomer to the suspension of said polyolefine is carried out during at least part of the period which consists of time before heating and during the heating of said suspension.

18. A process as claimed in claim 16, wherein the said polyolefine is polyethylene, wherein the aqueous phase is water, wherein said monomer is one selected from the group consisting of acrylic acid and methacrylic acid and wherein the temperature of reaction is in the range from 115° C. to 125° C.

19. A process as claimed in claim 16, wherein said polyolefine is polyethylene, wherein said monomer is selected from the group consisting of acrylic and methacrylic esters, wherein said aqueous phase is a mixture of water and dimethylformamide, and wherein the temperature of reaction is in the range from 120° C. to 140° C.

References Cited

UNITED STATES PATENTS

| | | | |
|---|---|---|---|
| 3,162,696 | 12/1964 | Zimmerman et al. | 260—878 |
| 3,222,423 | 12/1965 | Roebuck | 260—877 |
| 3,347,956 | 10/1967 | Rademacher | 260—878 |
| 3,355,517 | 11/1967 | Möllner et al. | 260—878 |
| 3,522,036 | 7/1970 | Vest et al. | 260—29.6 |

JOSEPH L. SCHOFER, Primary Examiner

S. M. LEVIN, Assistant Examiner

U.S. Cl. X.R.

260—93.7, 94.9 R; 117—132 C